US009497604B2

(12) United States Patent
Lim et al.

(10) Patent No.: US 9,497,604 B2
(45) Date of Patent: Nov. 15, 2016

(54) METHOD AND SYSTEM FOR TRANSMITTING A MESSAGE TO A TERMINAL HAVING NO ROUTING INFORMATION

(75) Inventors: Han Na Lim, Seoul (KR); Beom Sik Bae, Suwon-si (KR);
(Continued)

(73) Assignee: Samsung Electronics Co., Ltd., Suwon-si (KR)

( * ) Notice: Subject to any disclaimer, the term of this patent is extended or adjusted under 35 U.S.C. 154(b) by 892 days.

(21) Appl. No.: 13/521,551

(22) PCT Filed: Jan. 7, 2011

(86) PCT No.: PCT/KR2011/000116
§ 371 (c)(1),
(2), (4) Date: Mar. 5, 2013

(87) PCT Pub. No.: WO2011/087239
PCT Pub. Date: Jul. 21, 2011

(65) Prior Publication Data
US 2013/0155920 A1 Jun. 20, 2013

(30) Foreign Application Priority Data

Jan. 15, 2010 (KR) .................. 10-2010-0003722
Feb. 12, 2010 (KR) .................. 10-2010-0013257

(51) Int. Cl.
*H04B 7/00* (2006.01)
*H04W 4/14* (2009.01)
(Continued)

(52) U.S. Cl.
CPC ............... *H04W 4/14* (2013.01); *H04L 67/12* (2013.01); *H04W 4/005* (2013.01); *H04W 4/12* (2013.01); *H04L 12/5895* (2013.01); *H04W 8/26* (2013.01)

(58) Field of Classification Search
CPC ................. H04W 76/02; H04W 84/18; H04W 4/14; H04W 4/005; H04W 8/26; H04L 67/12; H04L 12/5895
See application file for complete search history.

(56) References Cited

U.S. PATENT DOCUMENTS 6,445,922 B1 *  9/2002  Hiller et al. .................. 455/433
8,503,391 B2 *  8/2013  Mahdi ........................... 370/331
(Continued)

FOREIGN PATENT DOCUMENTS

KR   10-2006-0037926 A    5/2006
KR   10-2006-0124462 A   12/2006
KR   10-2009-0087790 A    8/2009

*Primary Examiner* — Abdelnabi O Musa
(74) *Attorney, Agent, or Firm* — Jefferson IP Law, LLP

(57) ABSTRACT

A method and system for transmitting a message to a terminal is provided, and the method for transmitting a message in a message transmission system including an Inter-Working Function (IWF) identified by a Representative Mobile Subscriber Integrated Services Digital Network Number (R-MSISDN) according to an embodiment of the present invention includes transmitting, at transmission side, a message including the R-MSISDN and an address of a recipient terminal to the IWF; extracting, at the IWF, the address of the recipient terminal from the message; acquiring, at the IWF, routing information using the address of the recipient terminal; rebuilding, at the IWF, the message using the routing information; and transmitting, at the IWF, the rebuilt message to the recipient terminal based on the routing information. The method according to an embodiment of the present invention is advantageous to transmit a message in case where the recipient routing information is not provided.

10 Claims, 10 Drawing Sheets

(75) Inventors: Song Yean Cho, Seoul (KR); Haris Zisimopoulos, London (GB); Chae Gwon Lim, Seoul (KR)

(51) Int. Cl.
*H04W 4/12* (2009.01)
*H04W 4/00* (2009.01)
*H04L 29/08* (2006.01)
H04L 12/58 (2006.01)
H04W 8/26 (2009.01)

(56) References Cited

U.S. PATENT DOCUMENTS

| | | | |
|---|---|---|---|
| 8,676,195 B2* | 3/2014 | Zhang | H04L 29/06027 370/328 |
| 2005/0282565 A1* | 12/2005 | Shaheen | 455/466 |
| 2007/0184860 A1* | 8/2007 | Jansson | 455/466 |
| 2007/0243876 A1* | 10/2007 | Duan | 455/445 |
| 2007/0298817 A1* | 12/2007 | Alfano | H04W 4/14 455/466 |
| 2008/0039104 A1* | 2/2008 | Gu et al. | 455/445 |
| 2008/0123686 A1* | 5/2008 | Lee et al. | 370/466 |
| 2009/0131022 A1* | 5/2009 | Buckley | H04L 12/5895 455/412.1 |
| 2009/0221310 A1* | 9/2009 | Chen | H04L 12/5835 455/466 |

* cited by examiner

METHOD AND SYSTEM FOR TRANSMITTING A MESSAGE TO A TERMINAL HAVING NO ROUTING INFORMATION

BACKGROUND OF THE INVENTION

1. Field of the Invention

The present invention relates to a message transmission method and system and, in particular, to a method and system for transmitting a message to a terminal having no routing information such as Mobile Subscriber Integrated Services Digital Network Number (MSISDN).

2. Description of the Related Art

Recently, interest in Machine Type Communication (MTC) continues to increase. Representative case is the communication between an electric power metering device equipped with a communication module and a management device of the metering device operator through a wireless communication line for exchanging data and performing maintenance task. The above exemplary case is applicable for the gas and water supply measurement. Also, it is predicted that the application of this increases to various fields.

Currently, most of the radio communication operators use Over The Air (OTA) for managing terminals and Short Message Service (SMS) for delivering data to the terminals. These methods are likely to be used for the Machine Type Communication due to the advantages in convenience and verified technical features.

However, the Machine Type Communication is characterized in that its application is directed to a plurality of devices. Depending on the field, the number of devices may be a few dozen thousands to a few million devices. To allocate Mobile Subscriber Integrated Services Digital Network Number (MSISDN) to this great number of devices for SMS transmission causes resource waste. Accordingly, it is likely for the radio communication operator to rule out the MSISDN allocation to the terminals performing the machine type communication.

However, the SMS message is routed to the recipient based on the MSISDN of the recipient by Short Message Service Centre (SMSC). In case of delivering the SMS message based on the recipient's MSISDN, however, the terminal having the MSISDN cannot received the SMS message.

DISCLOSURE OF INVENTION

Technical Problem

The present invention has been made in an effort to solve the above problem and it is an object of the present invention to provide a device and method for delivering a message to the recipient having no rouging information.

Solution to Problem

In accordance with an aspect of the present invention, a method for transmitting a message in a message transmission system including an Inter-Working Function (IWF) identified by a Representative Mobile Subscriber Integrated Services Digital Network Number (R-MSISDN) includes transmitting, at transmission side, a message including the R-MSISDN and an address of a recipient terminal to the IWF; extracting, at the IWF, the address of the recipient terminal from the message; acquiring, at the IWF, routing information using the address of the recipient terminal; rebuilding, at the IWF, the message using the routing information; and transmitting, at the IWF, the rebuilt message to the recipient terminal based on the routing information.

In accordance with another aspect of the present invention, a message transmission system comprising an Inter Working Function (IWF) which is identified by a Representative Mobile Subscriber Integrated Services Digital Network Number (R-MSISDN), extracts, when a message including the R-MSISDN and address of a recipient terminal, the address of the recipient terminal from the message, acquires routing information using the address of the recipient terminal, rebuilds the message using the routing information, and transmits the rebuilt message to the recipient terminal based on the routing information.

Detailed features of other embodiments will be provided in the detailed description and drawings.

Advantageous Effects

The method according to an embodiment of the present invention is advantageous to transmit a message in case where the recipient routing information is not provided.

DETAILED DESCRIPTION OF EXEMPLARY EMBODIMENTS

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

In the present invention, the transmitter sends an Inter-Working Function (IWF) a Short Message Service (SMS) message including the address of a receiver. The SMS receiver address can be formed in a format different from Mobile Subscriber Integrated Services Digital Network Number (MSISDN). For example, the SMS receiver address can be a Network Access Identifier (NAI) or IP address. Also, the address of a Machine Type Communication (MTC) User Equipment (UE) can be included in the body of the SMS message or as a SMS message parameter.

The present invention proposes an entity, IWF, for receiving the SMS message on behalf of the receiver. IWF identifies the Representative MSISDN (hereinafter, RMSISDN) and analyzes the SMS message to check the SMS receiver address. The IWF sends the SMS receiver address to Home Subscriber Server (HSS) to acquire the routing-available receiver ID or address, reconfigures the SMS message in the routing-available format, and sends the reconfigured message to the receiver. The routing-available receiver ID or address can be the International Mobile Station Identity (IMSI) or IP address. Detailed IWF functions are described in the respective embodiments.

In the present invention, the description is directed to the exemplary case of Service Architecture Evolution/Long Term Evolution (SAE/LTE) standard of the 3$^{rd}$ Generation Partnership Project (3GPP). However, the present invention is applicable to other networks.

In an embodiment of the present invention, an SMS transmitter is a MTC Server 112, 308, and 514. The MTC server 112, 308, and 514 is an entity which sends the MTC UE 100, 300, and 500 an SMS message for management (e.g. OTA) and is installed within or out of mobile operator network.

The MTC Server transmits the SMS message as in an example as follows. If the message transmission manager selects an MTC UE, i.e. the MTC UE as a recipient of the SMS message, through an SMS transmission User Interface provided by the MTC Server, the MTC Server includes the ID or address of the MTC UE in the SMS message to be transmitted automatically and transmits the SMS message in which the MSISDN is reconfigured into R-MSISDN. The entire operations for the MTC Server to select the recipient MTC UE can be incorporated in the present invention.

The MTC UE denotes a mobile terminal specified in the conventional technology as the SMS recipient.

Figure 1:
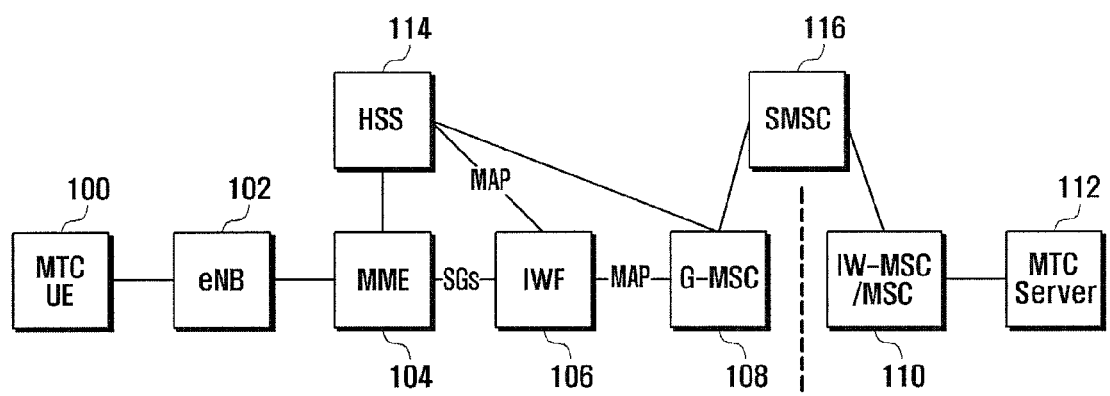
FIG. 1 is a diagram illustrating a network configuration of the SMS transmission system according to the first embodiment of the present invention.

FIG. 1 is a diagram illustrating a network configuration of the SMS transmission system according to the first embodiment of the present invention.

The first embodiment proposes a method for the IWF to forward the received SMS message to the MTC UE 100 through the MME 104 responsible for Circuit Switched (CS) Fallback function specified in 3GPP.

Referring to FIG. 1, the SMS transmission system according to the first embodiment of the present invention includes MTC UE 100, evolved Node B (eNB) 102, Mobility Management Entity (MME) 104, HSS 114, IWF 106, Gateway Mobile Switching Center (G-MSC) 108, SMSC 116, Interworking-MSC/MSC (IW-MSC/MSC) 110, and MTC Server 112.

The IW-MSC/MSC 110 and MTC Server 112 is an entity of the SMS transmission side. The IW-MSC/MSC 110 is a switch in the mobile operator network for transmitting SMS message. The MTC server 112 is an SMS transmitter. The MTC server 112 inserts the SMS recipient address in to the SMS message using R-MSISDN and transmits the SMS message.

The SMSC 116 is the entity for routing the SMS message to the G-MSC 108 of the receiver side.

The G-MSC 108, IWF 106, MME 104, eNB 102, and HSS 114 are the SMS receiver side entities. The G-MSC 108 determines the entity to deliver the received SMS message with the HSS 114 and delivers the received SMS message to the corresponding entity. According to the first embodiment of the present invention, the IWF 106 is the entity which receives the SMS message from the G-MSC 108. There can be multiple IWFs in the operator network, and the IWF can be implemented independently or incorporated in another entity. The IWF 106 is described in detail with reference to FIG. 2 afterward.

The MME 104 is the entity for managing the mobility of the UEs in the SAE/LTE network and participates in the process for delivering the SMS message received from the IWF 106 to the UE. The eNB 102 takes part in the above delivery process.

Figure 2:
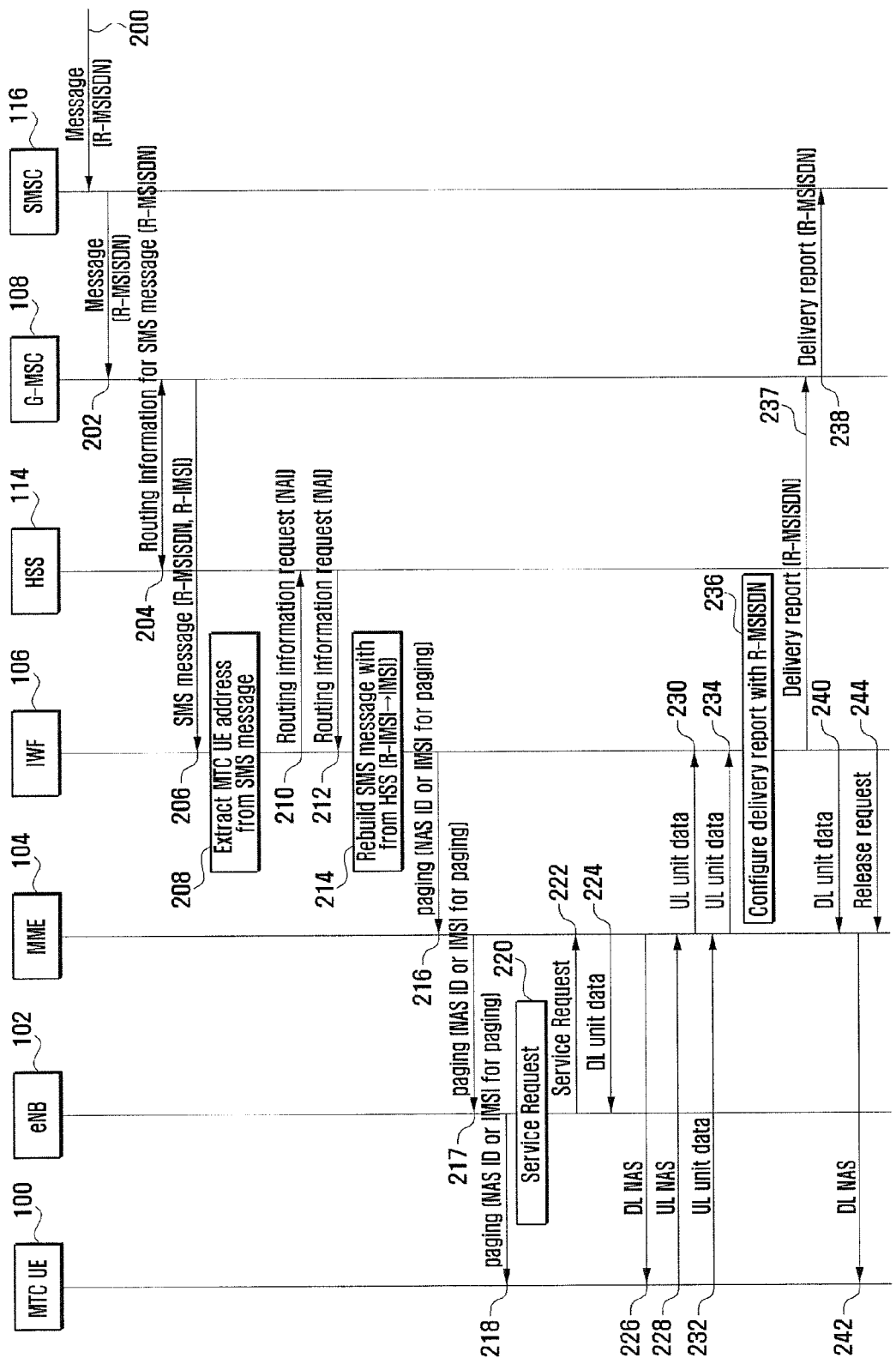
FIG. 2 is a signaling diagram illustrating the SMS message transmission procedure according to the first embodiment of the present invention.

FIG. 2 is a signaling diagram illustrating the SMS message transmission procedure according to the first embodiment of the present invention.

The MTC server 112 transmits the SMS message to the SMSC 116 at step 200. The SMS message includes the R-MSISDN.

The SMSC 116 transmits the SMS message to the G-MSC 108 at step 202. As at step 200, the SMS message includes the R-MSISDN.

The G-MSC 108 sends a message requesting for routing information to the HSS 114 at step 204. The routing information request message includes the R-MSISDN which is included in the SMS message of step 202. Upon receipt of the routing information request message, the HSS 114 sends the G-MSC 108 a Representative-IMSI (R-IMSI) mapped to the R-MSISDN. The R-IMSI is the IMSI allocated as an identifier of the IWF 106 along with the R-MSISDN as proposed in the present invention. Since the IMSI is necessary to route the SMS message delivered to the receiver side through the SMSC 116, it is allocated to the IWF 106 along with the R-MSISDN.

The G-MSC 108 forwards the SMS message to the IWF 106 at step 206. The G-MSC 108 also sends the R-IMSI mapped to the R-MSISDN included in the SMS message. The G-MSC 108 is capable of determining the IWF 106 to which the SMS message is to be forwarded based on at least one of the R-MSISDN and R-IMSI.

The IWF 106 analyzes the received SMS message and extracts the address of the address of the recipient MTC UE 100 from the SMS message. In this embodiment, the description is directed to the case where the address of the recipient MTC UE 100 is NAI.

The IWF 106 sends the HSS 114 a routing information request including the NAI extracted at step 208 in order to acquire the IMSI of the MTC UE 100 at step 210.

The HSS 114 sends the IWF 106 a routing information response in response to the routing information request at step 212. The routing information response includes IMSI of the MTC UE 100. In this embodiment, it is assumed that the HSS 114 has the mapping information of IMSI and NAI. According to another embodiment, however, the mapping information of IMSI and NAI can be retained in another entity than HSS 144. In this case, the HSS 114 requests the entity having the IMSI and NAI for the IMSI corresponding to NAI and sends the IMSI to the IWF 106. The IWF 106 also can request the other entity, not HSS 144, having the mapping information of IMSI and NAI for the routing information directly.

At step 214, the IWF 106 rebuilds the SMS message using the IMSI of the MTC UE 100 which is received at step 212. The IWF 106 converts the R-IMSI to IMSI. In case that the recipient address of the MTC UE 100 is included in the body of the SMS message, the recipient address of MTC UE 100 can be removed.

The IWF 106 requests the MME 104 having the CS fallback function defined in 3GPP for SMS delivery at step 216.

At steps 217 to 234, the SMS message is delivered to the MTC UE 100 and the MTC UE 100 sends a message notifying of the SMS delivery to the MTC UE 100. At steps 217 and 218, paging is performed to the MTC UE 100 through the MME 104 and eNB 102. At steps 220 and 222, a service request is transmitted from the MME 104 to the IWF 106. The IWF 106 sends a downlink data unit to the MME 104 at step 224, and the MME 104 performs downlink NAS transmission to the MTC UE 100 at step 226. The MTC UE 100 performs uplink NAS transmission to the MME 104 at step 228, and the MME 104 performs uplink unit data transmission to the MME 104 at step 230. The MTC UE 100 performs uplink NAS transmission to the MME 104 at step 232. Steps 217 to 234 follows the process of SMS transmission from the MME supporting CS fallback to the UE as specified in 3GPP standard. Since this is the well-known technology, detailed description thereon is omitted herein.

The MME 104 sends the IWF 106 a message notifying of the SMS message delivery to the MTC UE 100 at step 234.

Upon receipt of the SMS message delivery notification message, the IWF 106 generates a delivery report addressed to the R-MSISDN at step 236. The IWF 106 sends the delivery report to the G-MSC 108 at step 237.

The IWF 106 sends the downlink unit data to the MME 104 at step 240, and the MME 104 performs downlink NAS transmission to the MTC UE 100 at step 242. The IWF 106 sends the MME 104 a release request at step 244. Steps 240 to 244 follow the process specified in the 3GPP standard. Since this is well-known technology, detailed description thereon is omitted herein.

Figure 3:
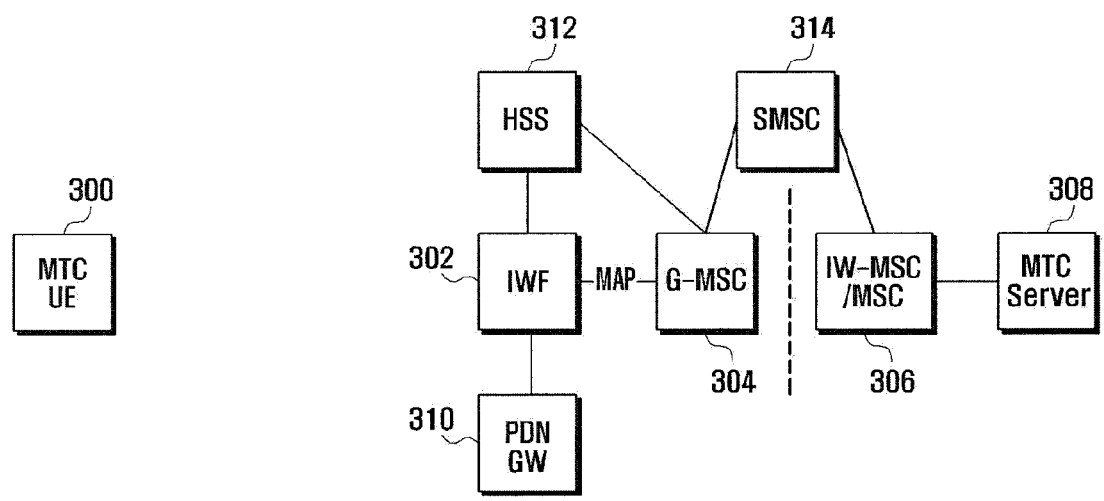
FIG. 3 is a diagram illustrating a network configuration of a SMS message transmission system according to the second embodiment of the present invention.

FIG. 3 is a diagram illustrating a network configuration of a SMS message transmission system according to the second embodiment of the present invention. In the second embodiment of the present invention, the IWF 302 sends the MTC UE 300 the received SMS message according to the Packet Data Network (PDN) data transmission scheme defined in 3GPP standard.

Referring to FIG. 3, according to the second embodiment of the present invention, the SMS message transmission system includes an MTC UE 300, an IWF 302, a G-MSC 304, a PDN Gateway (PDN GW) 310, an HSS 312, an SMSC 314, an IW-MSC/MSC 306, and an MTC server 308.

The transmission side entities of the SMS message transmission system according to the second embodiment of the present invention, i.e. IW-MSC/MSC 306, MTC Server 308, and SMSC 518 are in the same configurations as those of FIG. 1. The PDN GW 310 is the entity responsible for IP data transmission in the SAE/LTE network and participates in the process for delivering the SMS message received from the IWF 302 to the MTC UE 300 in this embodiment. Other entities are in the same configurations as those of FIG. 1.

Figure 4:
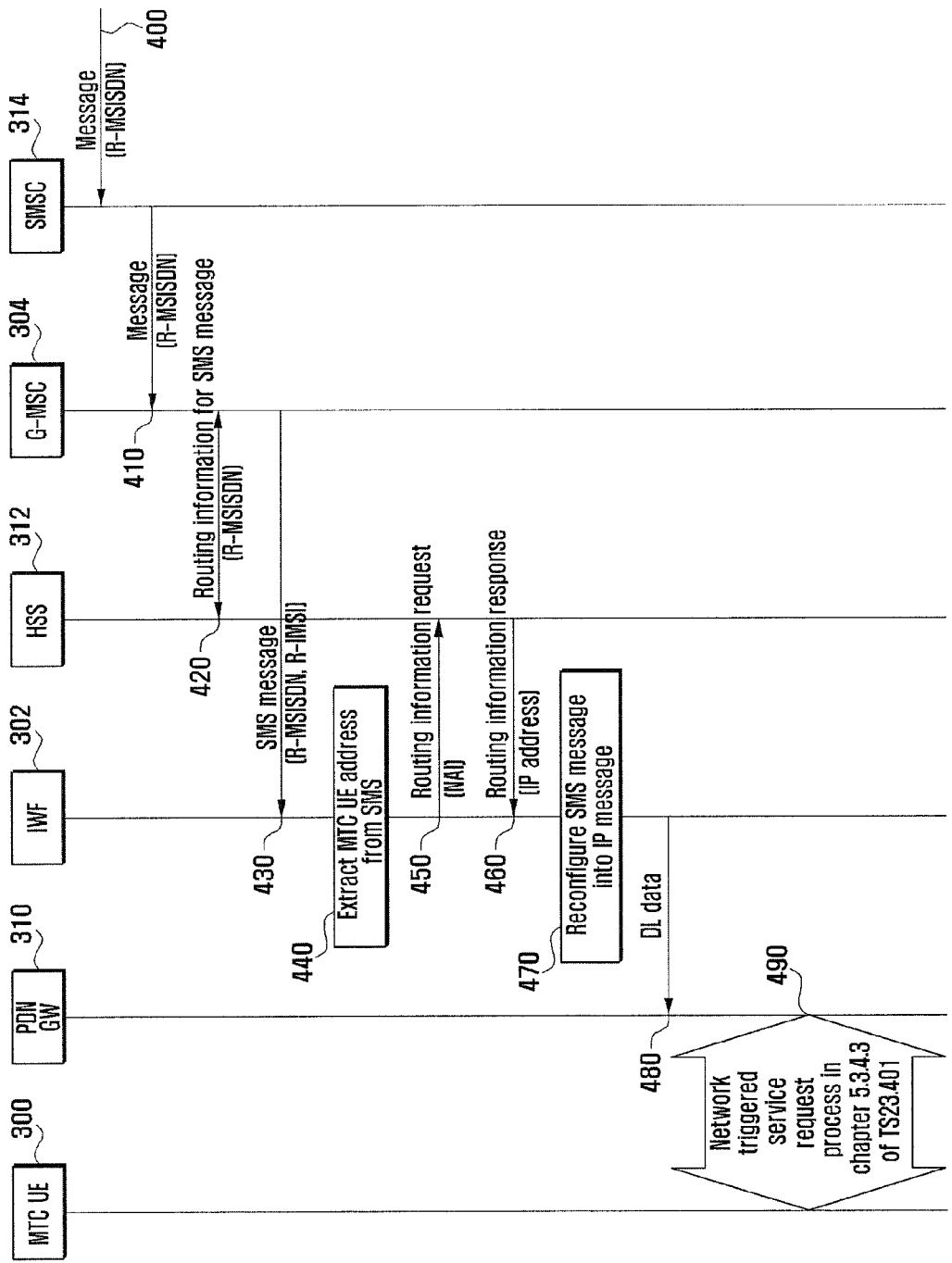
FIG. 4 is a signaling diagram illustrating the SMS message transmission procedure according to the second embodiment of the present invention.

FIG. 4 is a signaling diagram illustrating the SMS message transmission procedure according to the second embodiment of the present invention.

Step 400 corresponds to step 200 of FIG. 2, step 410 to step 202 of FIG. 2, step 420 to step 204 of FIG. 2, and step 430 to step 206 of FIG. 2. Step 440 corresponds to step 208 of FIG. 2. At step 400, the MTC Server 308 sends the SMSC 314 a SMS message including R-MSISDN. At steps 410, 420, and 430, the SMSC 314 sends the IWF 302 the SMS message received from the SMSC 314 at step 400 via the G-MSC 304. At step 440, the IWF 302 extracts the receiver address NAI of the MTC UE 300 from the received SMS message.

At step 450, the IWF sends a routing information request to the HSS 312 to request for the IP address of the MTC UE 300.

At step 460, the HSS 312 sends the IWF 302 the IP address in a routing information response. In this embodiment, it is assumed that the HSS 312 retains the mapping information of the IP address and NAI. The mapping information can be retained by another entity than the HSS 312 and, in this case, the HSS 312 can deliver the rouging information acquired from another entity in response to the routing information request to the IWF 302, or the IWF 302 is capable of requesting another entity retaining the mapping information of the IP address and NAI than the HSS 312 for the routing information directly.

At step 470, the IWF 302 reconfigures the SMS message into an IP message using the IP address of the MTC UE 300 which is acquired at step 460.

At step 480, the IWF 302 sends the reconfigured IP message to the PDN GW 310.

At step 490, the PDN GW 310 sends the IP message to the MTC UE 490 through the Network Triggered Service Request process specified in the 3GPP standard. Since this is the well-known technology, detailed description is omitted herein.

Figure 5:
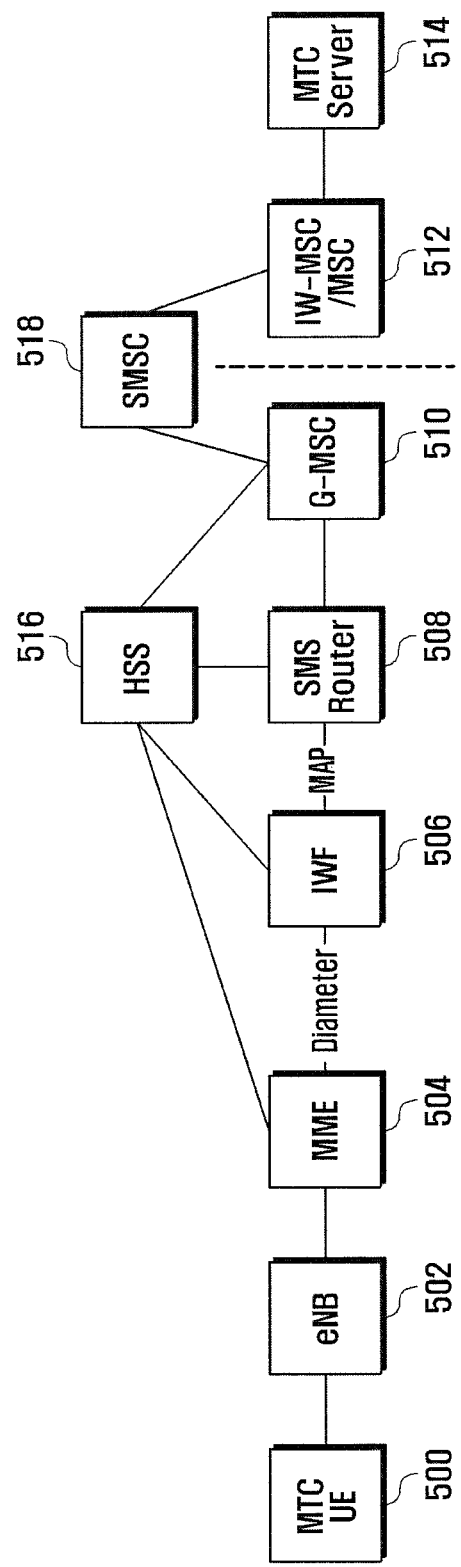
FIG. 5 is a diagram illustrating a network configuration of the SMS message transmission system according to the third embodiment of the present invention.

FIG. 5 is a diagram illustrating a network configuration of the SMS message transmission system according to the third embodiment of the present invention. The third embodiment of the present invention a method for the IWF 506 to send the SMS message to the MTC UE 500 via the MME 504 supporting a Diameter message defined newly for SMS message transmission.

Referring to FIG. 5, the SMS message transmission system according to the third embodiment of the present invention includes a MTC UE 500, an eNB 502, an MME 504, an IWF 506, an HSS 516, an SMS router 508, a G-MSC 510, an SMSC 518, an IW-MSC/MSC 512, and an MTC Server 514. The transmission side entities of the third embodiments, i.e. MTC server 514, IW-MSC/MSC 412, and SMSC 518 are in the same configurations as those of FIG. 1. The SMS Router 508 is an optional entity for notifying the G-MSC 510 of the entity to which the SMS message is addressed and thus it is possible to deliver the SMS message to the IWF 506 without the SMS Router 508 as described with reference to FIGS. 1 and 3. In this embodiment the SMS Router 508 is included in order to incorporate the case where the SMS Router 508 is involved in the present invention. However, it is noted that this embodiment can be implemented without the SMS Router 508.

In the third embodiment of the present invention, the MME 504 supports the Diameter message defined newly for SMS message transmission. The definition on the Diameter message is under discussion in the 3GPP standard meeting. The difference between the first and second embodiments is the function supported by the MME 504 to which the IWF 506 transmits the SMS message. The other steps are identical with each other.

Figure 6:
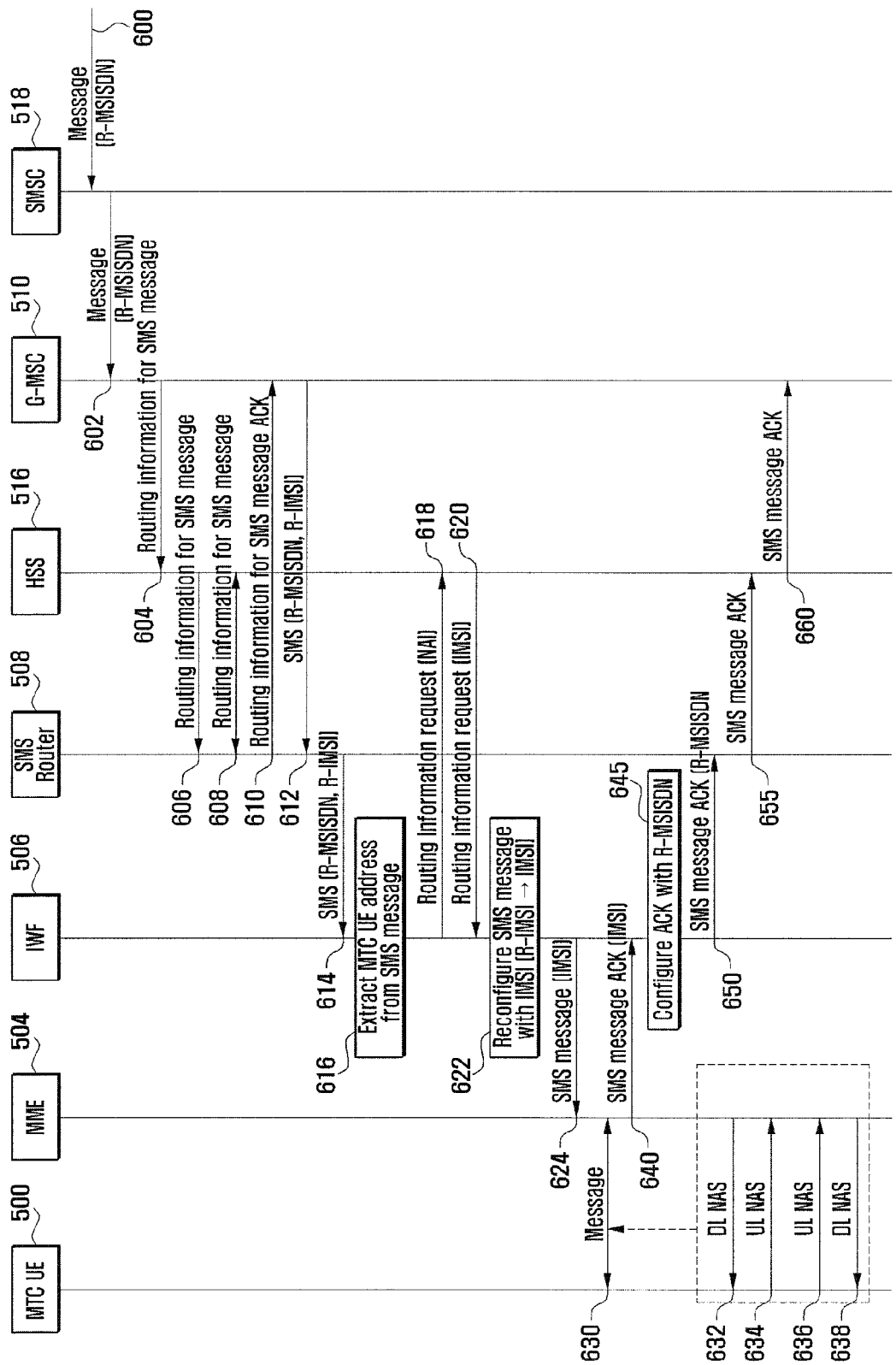
FIG. 6 is a signaling diagram illustrating the SMS message transmission procedure according to the third embodiment of the present invention.

FIG. 6 is a signaling diagram illustrating the SMS message transmission procedure according to the third embodiment of the present invention.

The MTC Server 514 sends an SMS message to the G-MSC 510 at steps 600 and 602. Since the process of steps 600 and 602 correspond to steps 200 and 202 of FIG. 2, detailed description thereon is omitted herein. The G-MSC 510 sends a routing information request including R-MSISDN to the HSS 516 at step 604. The HSS sends the routing information request including R-MSISDN to the SMS router 508 at step 606. The SMS router 508 and HSS 516 extract the routing information and, if the extraction has completed, the SMS router 508 sends the G-MSC 510 a ACK message notifying of the routing information extraction completion. Upon receipt of the ACK message, the G-MSC 510 forwards the SMS message including R-MSISDN and R-IMSI to the SMS Router 508 at step 612. The SMS router 508 forwards the SMS message to the IWF 506 at step 614.

Step 616 corresponds to step 208 of FIG. 2, step 618 to step 210 of FIG. 2, step 620 to step 212 of FIG. 2, and step 622 to step 214 of FIG. 2. Summarizing the process of steps 616, 618, 620, and 622, the IWF 506 extracts NAI from the received SMS message, requests the HSS 516 for the IMSI of the MTC UE 500, and rebuilds the SMS message using the IMSI received from the HSS 516. See the detailed description on steps 208, 210, 212, and 220 of FIG. 2.

The IWF 506 sends the Diameter SMS message to the MME 504 at step 624. The Diameter SMS message is the message obtained by converting the SMS message transmitted from the IWF 506 to the SMS router 508 into Diameter format.

The MME 504 sends the SMS message to the MTC UE 500 at step 630 and this process also uses the message transmission method defined in the 3GPP standard. In detail, the MME 504 performs downlink NAS transmission to the MTC UE 500 at step 632 and the MTC UE 500 performs uplink NAS transmission to the MME at step 634. The MTC UE 500 performs uplink NAS transmission to the MME 504 at step 636. The MME 504 performs downlink NAS transmission to the MTC UE 500 at step 638.

After completing the message transmission, the MME 504 sends the IWF 506 a Diameter SMS message transmission ACK at step 640. The Diameter SMS message transmission ACK is generated by converting the message identical with the MAP SMS message transmission ACK in diameter format.

The IWF 506 converts the Diameter SMS message transmission ACK message to the MAP SMS message transmission ACK message at step 645. The IWF 506 sends the MAP SMS message transmission ACK message to the SMS Router 508 at step 650. The MAP SMS message transmission ACK message is transmitted to the SMSC 518 via the G-MSC 510 at steps 655 and 660.

The present invention is application to the IP Multimedia Subsystem (IMS).

Figure 7:
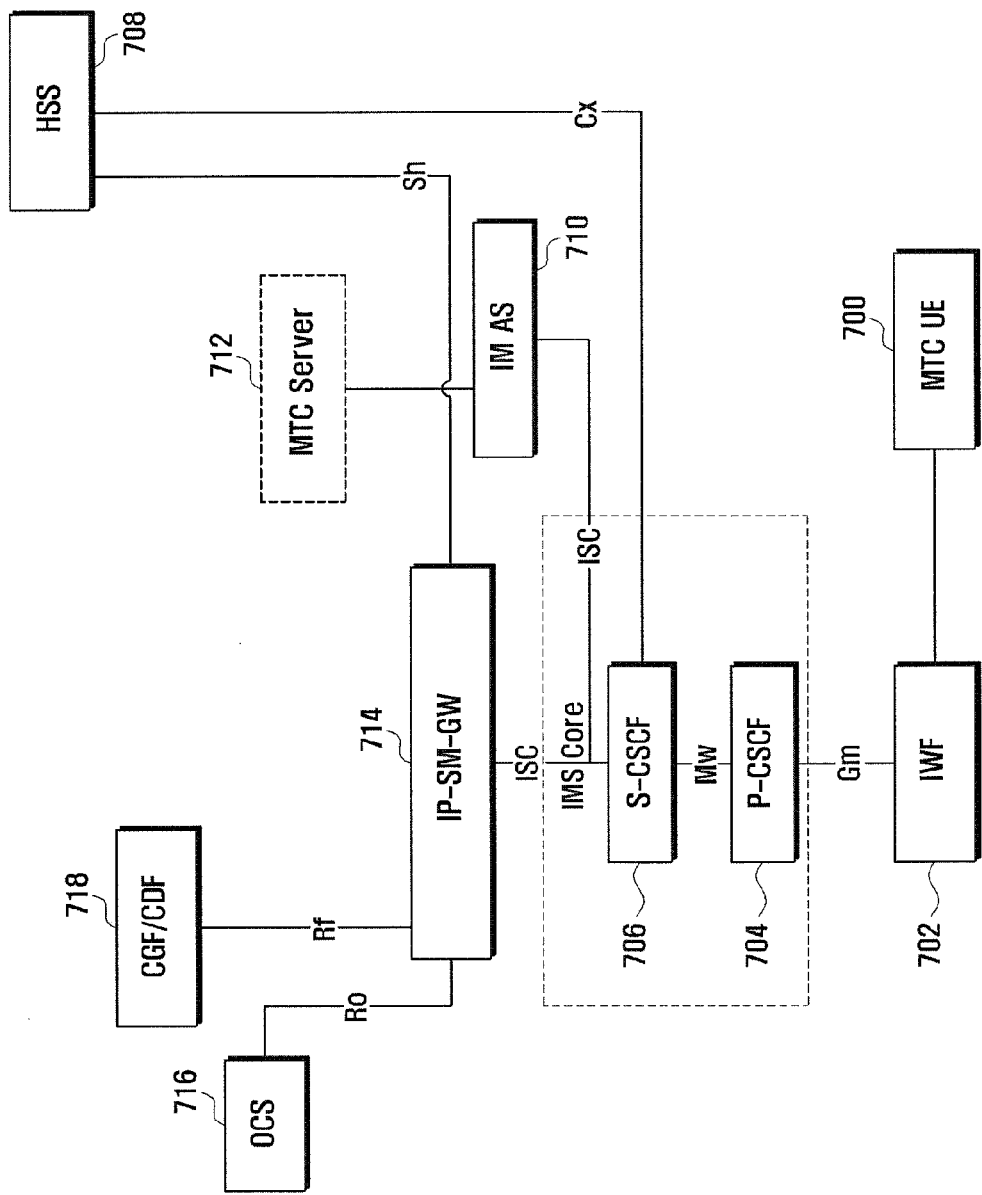
FIG. 7 is a diagram illustrating a network configuration of the SMS message transmission system according to the fourth embodiment of the present invention.

FIG. 7 is a diagram illustrating a network configuration of the SMS message transmission system according to the fourth embodiment of the present invention.

According to the fourth embodiment of the present invention, the MTC Server 712 connected to the IMS network application server (IM AS) 710 sends the SMS message to the MTC UE 700 which does not support IMS and has not MSISDN.

The Proxy-Call Session Control function (P-CSCF) 704, Serving-Call Session Control Function (S-CSCF) 706, IMS Application Server (IM AS) 710, Internet Protocol Short Message Gateway (IP-SM-GW) 714, HSS 708, Online Charging System (OCS) 716, and Charging Data Function/Charging Gateway Function (718) are the network entities which allows the non-IMS UE and IMS UE to exchange messages (including SMS message) in the legacy 3GPP IMS. In detail, the IP-SM-GW 714 is responsible for service level interworking. Since other entities have nothing to do with the present invention directly, detailed descriptions thereon are omitted herein.

The network entities added in this embodiment are the MTC server 712 and the IWF 702. In this embodiment, the MTC Server 712 is connected to the IMS application server (IM AS) 710 of the operator network. In addition to the functions used in the first, second, and third embodiments, the IWF 702 is provided with a function for establishing a connection to the P-PCSCF 704 and registers itself, on behalf of the MTC UE 700, with the IP-SM-GW 714 to receive the IMS message transmitted from the MTC Server 712 to the MTC UE 700. Here, the description is directed to the case where the Uniform Resource Identifier (URI), e.g. Session Initiation Protocol (SIP) URI and tel URI are used as the identifier of the MTC UE 700. The MTC UE 700 also can have a group URI which can be used, as the identifier indicating a group of a plurality of MTC UEs 700, to transfer the same message to the plural MTC UEs 700.

Figure 8:
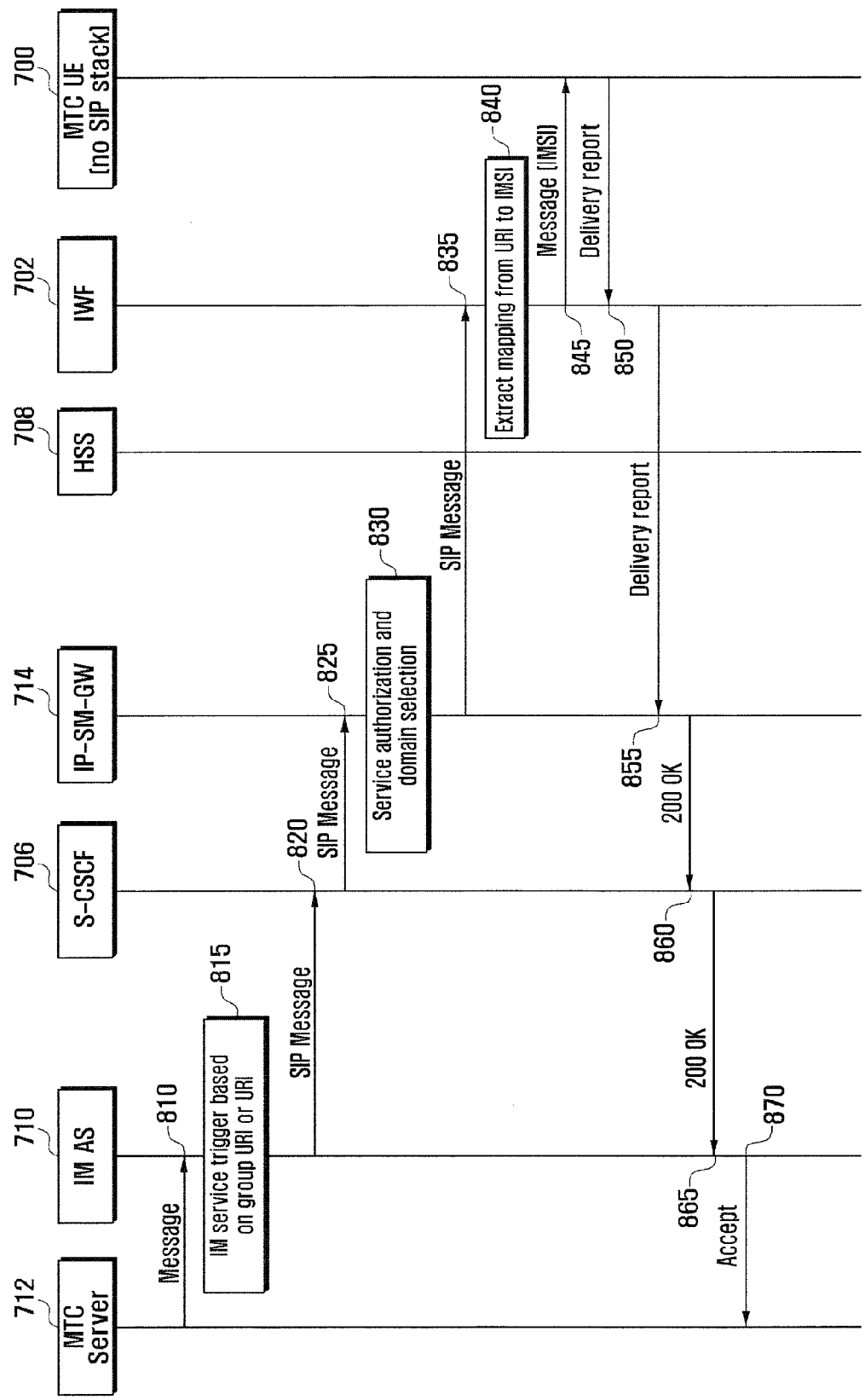
FIG. 8 is a signaling diagram illustrating the SMS message transmission procedure according to the fourth embodiment of the present invention.

FIG. 8 is a signaling diagram illustrating the SMS message transmission procedure according to the fourth embodiment of the present invention.

The MTC server 712 sends the IM AS 710 an IP message including URI or group URI of the MTC UE 700 at step 810. The IP message is one of the various types of IP messages, e.g. SIP message, and it is assumed that the MTC server 712 supports transmission of the corresponding type of IP message.

The IM AS 710 determines the MTC UE(s) 700 to which the message received from the MTC server 712 is addressed. If the IP message includes a group URI, the IM AS 710 checks the MTC UEs 700 within the corresponding group.

The IM AS 710 is capable of including the IP message received at step 810 in the SIP message or converting the received IP message to the SIP message to be delivered to the S-CSCF 706 at step 820.

The S-CSCF 706 sends the SIP message received at step 820 to the IP-SM-GW 714 according to initial Filter Criteria (iFC).

The IP-SM-GW 714 performs Service authorization and Service level interworking at step 830. At this time, it is assumed that the IWF 702 is registered with the IP-SM-GW as the IWF corresponding to the MTC UE 700.

The IP-SM-GW 714 sends the SIP message received at step 825 to the IWF 702 at step 835.

The IWF 702 extracts the IMSI of the MTC UE 700 as the recipient of the message from the MTC UE URI and generates the SMS message to be transmitted to the MTC UE 700 as described in the first, second, and third embodiments. The IWF 702 is capable of extracting the IMSI of the MTC UE 700 as the recipient of the message from the MTC UE URI using the mapping between the MTC UE URI and IMSI that has been stored already. The IWF 702 is also capable of extracting the IMSI of the MTC UE 700 as the recipient of the message by applying the MTC UE URI to a predetermined formula.

The IWF 702 sends the SMS message generated at step 840 to the MTC UE 700 at step 845. The MTC UE 700 sends the IWF 702 a delivery report notifying of the successful transmission of the message at step 850. In case that the message transmission is erroneous, the delivery report may include the information on the error. Since steps 845 and 850 are similar to steps 215 to 234 of FIG. 2, detailed descriptions thereon are omitted herein.

The IWF 702 sends the delivery report to the IP-SM-GW 714 at step 855. The delivery report transmitted from the IP-SM-GW 714 to the S-CSCF 706 can be the "200 OK" message. The S-CSCF 706 sends the delivery report to the IM AS 710 at step 865. The delivery report transmitted from the S-CSCF 706 to the IM AS 710 can be the "200 OK" message.

The IM AS 710 forwards the delivery report in the format received at step 810 to the MTC Server 712 at step 870. The body of the delivery report of steps 855 to 870 depends on the delivery report at the previous step. That is, the delivery report transmission objects, i.e. IWF 702, IP-SM-GW 714, S-CSCF 706, and IM AS 710, transmit the delivery report identical with or corresponding to that of the previous step in content.

Figure 9:
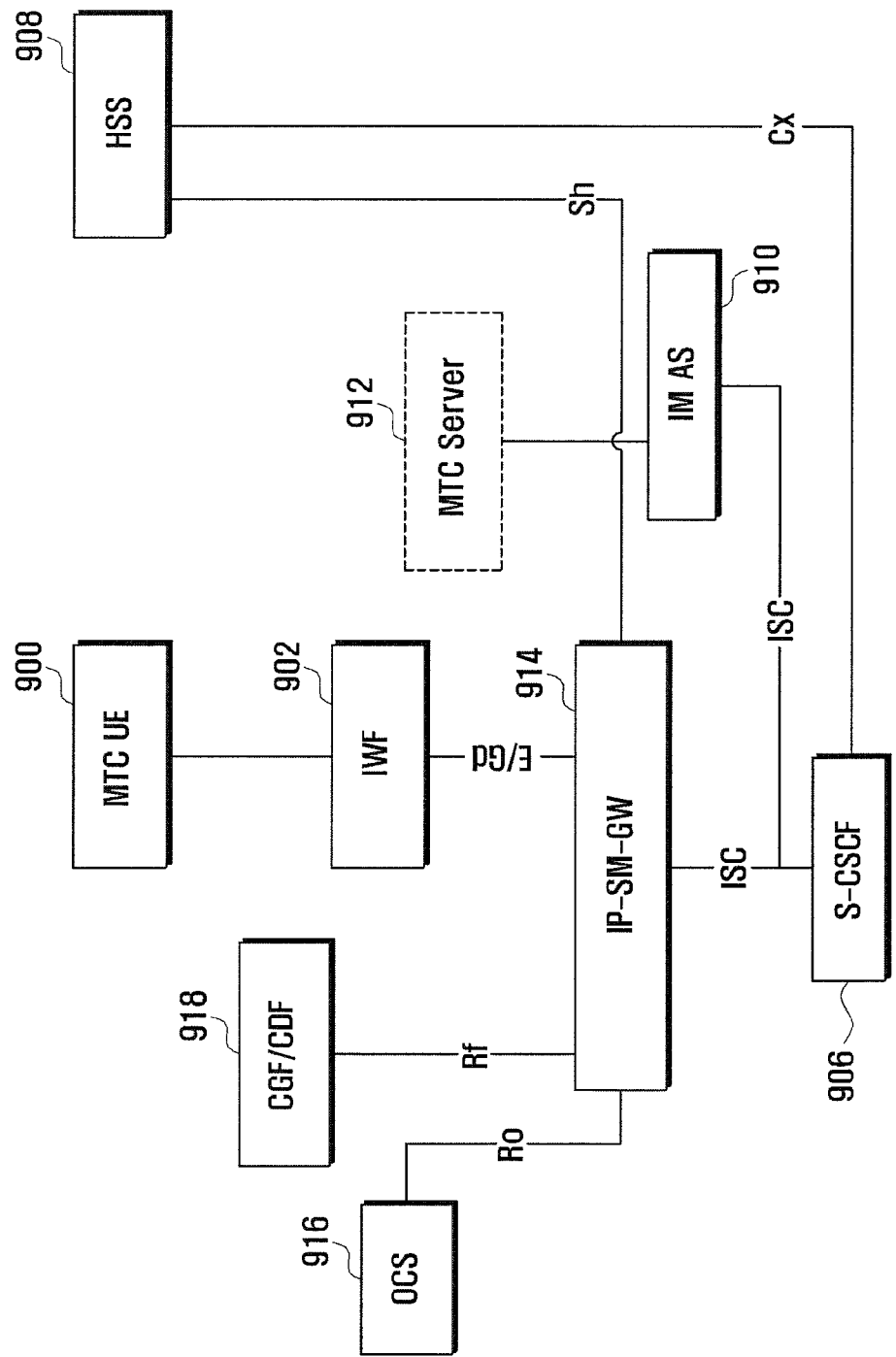
FIG. 9 is a diagram illustrating a network configuration of the SMS message transmission system according to the fifth embodiment of the present invention.

FIG. 9 is a diagram illustrating a network configuration of the SMS message transmission system according to the fifth embodiment of the present invention. The fifth embodiment of the present invention proposes a method for the MTC server 912 connected to the IMS network application server (IM AS) 910 to transmit the SMS message to the MTC UE 900 which does not support IMS and has no MSISDN, using the IMS message. The fourth and fifth embodiments can be discriminated from each other depending on the entity supporting the SIP protocol. In the fourth embodiment, the legacy IP-SM-GW 714 is used as it were and IWF 702 supports SIP protocol. In the fifth embodiment, however, the IWF 902 does not support the SIP protocol as the IWF in the first, second, and third embodiments, but the IP-SM-GW 914 converts the SIP message received from the S-CSCF 906 to the Forward SMS message to be transmitted to the IWF. The Forward SMS message delivery process is identical with those of step 206 of FIG. 2, 430 of FIG. 4, and 614 of FIG. 6, detailed description thereon is omitted herein.

That is, the IWF 902 uses a different protocol than SIP in order to communicate with the IP-SM-GW 914 in the present invention.

Figure 10:
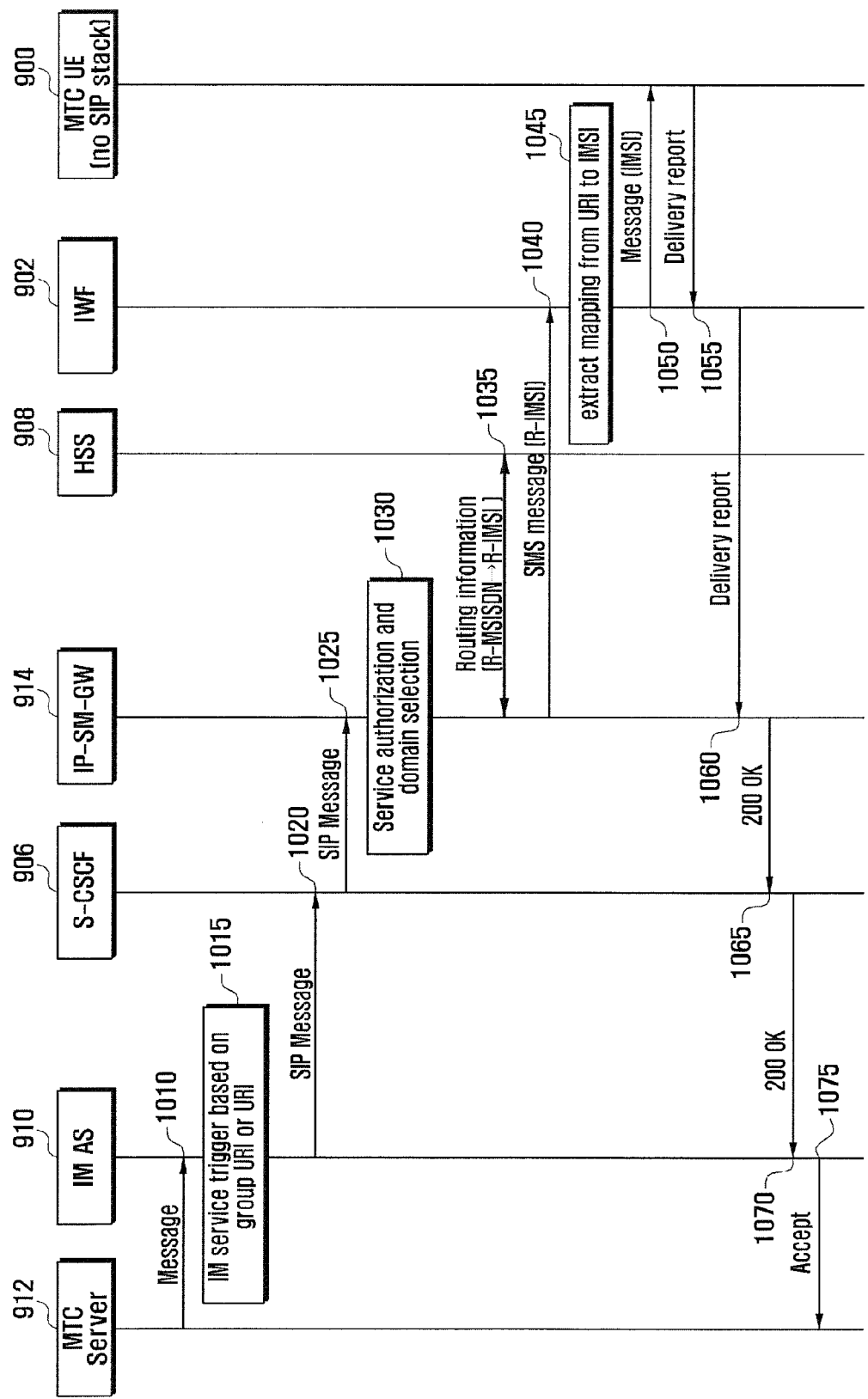
FIG. 10 is a signaling diagram illustrating the SMS message transmission procedure according to the fifth embodiment of the present invention.

FIG. 10 is a signaling diagram illustrating the SMS message transmission procedure according to the fifth embodiment of the present invention.

Since steps 1010 to 1030 are identical with steps 810 to 830 of FIG. 4, detailed descriptions thereon are omitted herein.

The IP-SM-GW 914 extracts R-MSISDN from the received SIP message at step 1035. The R-MSISDN is included in the message transmitted by the MTC server 912 at step 1010 or extracted from the SIP URI used as the recipient address. The IP-SM-GW 914 sends the Routing Information Request including the extracted R-MSISDN to the HSS 908 to acquire R-IMSI for routing the Forward SMS message.

The IP-SM-GW 914 sends the SMS message to the IWF 902 in the Forward SMS message at step 1040.

The process of transmitting the SMS message to the MTC UE 900 at steps 1045 and 1040 can be performed in similar manner to those at steps 206 go 226 of FIG. 2 of the first embodiment, steps 440 to 490 of FIG. 4 of the second embodiment, and steps 616 to 630 of FIG. 6 of the third embodiment.

Although the description is directed to the SMS message transmission, the present invention can be applied to the system using other types of message that can be delivered using IMSI or IP.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

What is claimed is:

1. A method for transmitting a message by an interworking function (IWF) in a message transmission system, the method comprising:

receiving a message including a representative mobile subscriber integrated services digital network number (R-MSISDN) and an address of a recipient terminal from a transmission side;
 extracting a network access identifier (NAI) address of the recipient terminal from the message;
 acquiring routing information using the NAI address of the recipient terminal;

rebuilding the message using the routing information by converting a representative international mobile station identity (R-IMSI) to IMSI and mapping the IMSI and the NAI; and transmitting the rebuilt message to the recipient terminal based on the routing information, wherein the IWF receives the message on behalf of the recipient terminal having no mobile subscriber integrated services digital network number (MSISDN), wherein the R-MSISDN is allocated as an identifier of the IWF along with the R-IMSI mapped to the R-MSISDN, and wherein the IWF is determined based on at least one of the R-MSISDN and the R-IMSI.

2. The method of claim 1, wherein the receiving of the message including the R-MSISDN and the address of the recipient terminal comprises:

receiving the message from a gateway mobile switching center (G-MSC), wherein the message is transferred from the transmission side to the G-MSC.

3. The method of claim 1, where acquiring routing information using the address of the recipient terminal comprises:

transmitting a routing information request including the address of the recipient terminal to a home subscriber server (HSS); and receiving from the HSS, the routing information corresponding to the address of the recipient terminal.

4. The method of claim 1, wherein the routing information is one of International a mobile station identity (IMSI) or an internet protocol (IP) address of the recipient terminal.

5. The method of claim 1, further comprising:

receiving, a message delivery complete ACK from the recipient terminal;

rebuilding the ACK using the R-MSISDN corresponding to the IWF; and delivering the rebuilt ACK to a message service center.

6. An inter working function (IWF) device in a message transmission system, the IWF device comprising:

a memory with instructions stored thereon; and a processor electrically connected to the memory, the processor when executing the instructions is configured to:

extract, when a message including a representative mobile subscriber integrated services digital network number (R-MSISDN) and address of a recipient terminal is received, a network access identifier (NAI) address of the recipient terminal from the message, acquire routing information using the NAI address of the recipient terminal, rebuild the message using the routing information by converting the a representative international mobile station identity (R-IMSI) to IMSI and mapping the IMSI and the NAI, and transmit the rebuilt message to the recipient terminal based on the routing information, wherein the IWF device receives the message on behalf of the recipient terminal having no mobile subscriber integrated services digital network number (MSISDN), wherein the R-MSISDN is allocated as an identifier of the IWF device along with the R-IMSI mapped to the R-MSISDN, and wherein the IWF device is determined based on at least one of the R-MSISDN and the R-IMSI.

7. The IWF device of claim 6, wherein the processor is further configured to control receiving of the message from a gateway mobile switching center (G-MSC), and wherein the message is transferred from the transmission side to the GMSC.

8. The IWF device of claim 6, wherein the processor is further configured to control:

transmitting of a routing information request including the address of the recipient terminal to a home subscriber server (HSS), and receiving of, from the HSS, the routing information corresponding to the address of the recipient terminal.

9. The IWF device of claim 6, wherein the routing information is one of international a mobile station identity (IMSI) or an internet protocol (IP) address of the recipient terminal.

10. The IWF device of claim 6, wherein the processor is further configured to:

control receiving of a message delivery complete ACK from the recipient terminal, rebuild the ACK using the R-MSISDN corresponding to the IWF, and control transmitting of the rebuilt ACK to a message service center.

* * * * *